March 30, 1965          P. MÜLLER          3,176,132
LUMINOUS SOURCE WHEREIN THE LUMINESCENT MATERIAL IS
ACTIVATED BY RADIATION FROM A RADIOACTIVE SOURCE
Filed April 15, 1960
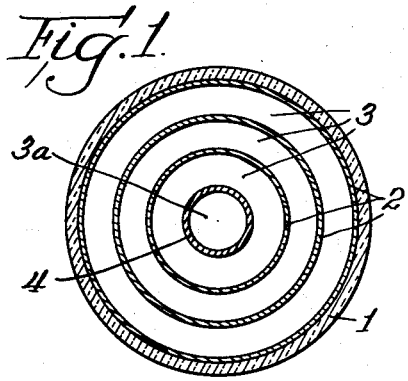
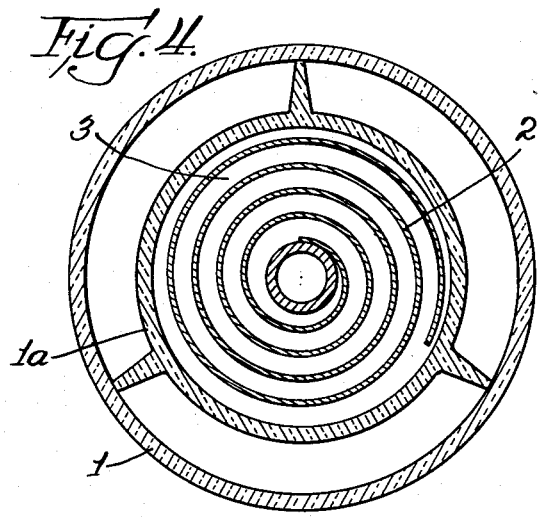
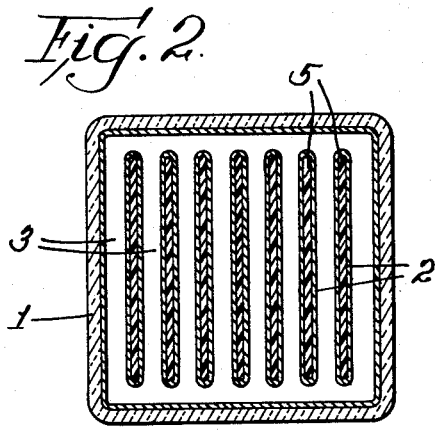
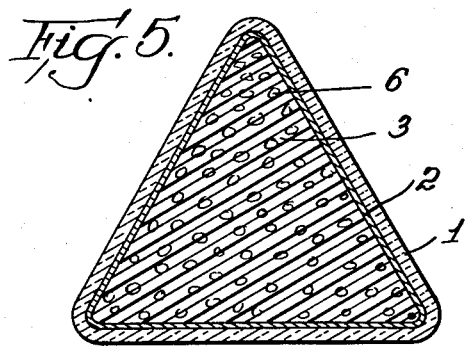
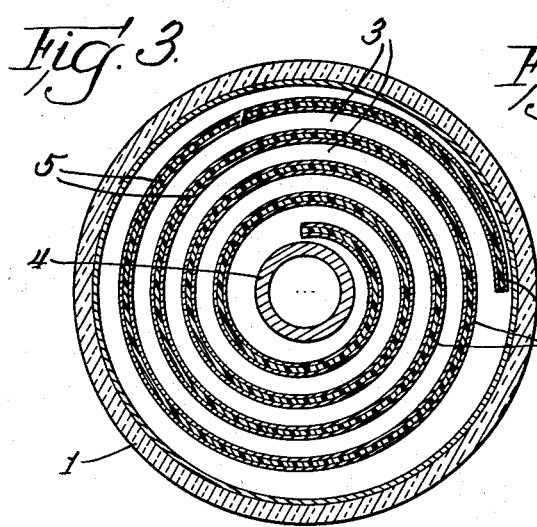
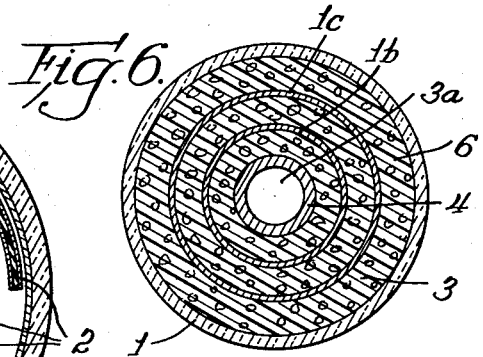
INVENTOR.
Paul Müller
BY
Darby, Robertson & Vandenburgh
Att'ys.

3,176,132
Patented Mar. 30, 1965

3,176,132
LUMINOUS SOURCE WHEREIN THE LUMINESCENT MATERIAL IS ACTIVATED BY RADIATION FROM A RADIOACTIVE SOURCE
Paul Müller, 9 Am Bergwerk, Ostheim, Kreis Hanau, Germany
Filed Apr. 15, 1960, Ser. No. 22,468
Claims priority, application Germany, Apr. 20, 1959, L 33,027
10 Claims. (Cl. 250—71)

This invention is concerned with a luminous source in which a luminescent substance is exposed to the radiation of a radioactive substance.

In well known luminous sources of this kind, only the inner surface of the lamp housing is covered with the luminescent substance and thus are similar to normal gas discharge lamps. These well known luminous sources have a little luminous flux and luminance, and this is the reason why these luminous sources have not been successful in practice.

These disadvantages of the arrangement well known in the art are primarily due to the fact that the thickness of the luminescent substance and also the quantity of isotopes made effective are limited by the range of transmission of the radiation emitted. Actually, it is not reasonable to increase the thickness of the luminescent substance over a certain value which corresponds to the range of transmission of the radiation in the respective material. These conditions will be explained by way of the following example:

As is well known, the transmission range depends on the density of the material through which the radiation passes. The maximum transmission range of the radiation is thus determined by the weight per unit of surface of a substance layer which is the maximum that can just be penetrated by the radiation. Let us assume that tritium ($_1H^3$) is provided as a radiant substance. Tritium emits $\beta$-rays, the energy of which is sufficient to penetrate a layer having a weight per unit of surface of 0.2 mg./cm.$^2$. With a luminescent substance having a density of 2 g./cm.$^3$, this would correspond to a layer thickness of 1$\mu$. In a radiant substance containing tritium and having a density of 1 g./cm.$^3$, for instance, the rays would just be capable of penetrating a layer of approximately 2$\mu$. It would be senseless to endeavor to increase the luminous intensity of the lamp by providing the radiant substance with a layer thickness greater than 2$\mu$ because only the upper 2$\mu$ of such a layer would be effective.

Even if such a lamp were filled with tritium in its gaseous state under normal conditions, the range of transmission obtained in the gas would only be 0.7 cm. It is then absolutely unsuitable, in order to obtain greater luminous density, to increase the size of the lamp over approximately 1.4 cm. An increase in pressure would decrease the transmission range correspondingly so that with tubular luminous sources, for instance, the quantity of gas to be filled per unit of length into the lamp would be rather limited. If now one considers that 1 litre of tritium under normal conditions gives a radiation of 2700 Curie and a radiated power of 0.2 watt, and that a considerable portion of the $\beta$-particles emitted—even for geometrical reasons—does not reach the wall of the lamp, so that only a fraction of the energy available is utilized for the generation of light, there results such a low luminous efficiency that lamps of this kind would be unsuitable for use in actual practice. The conditions also cannot be improved if, for instance, the layer of luminescent substance is covered with a layer of a material containing tritium, because more than half of the $\beta$-particles will not reach the luminescent substance.

Somewhat more favourable conditions are present if krypton 85 ($_{36}Kr^{85}$) is used. This is due to the fact that the $\beta$-particles emitted have a greater energy (0.4 mev.) and therefore are capable of penetrating layers of greater thickness. The mean weight per unit of surface, which is still penetrated by the rays, is 110 mg./cm.$^2$, so that a transmission range of 0.55 mm. is obtained in a luminescent substance with a density of 2 g./cm.$^3$ and a transmission range of 29 cm. results in krypton gas under normal conditions. However, in this case also there are limits with respect to the luminous efficiency obtainable which cannot be surpassed.

It must be further observed that the isotopes in addition to the $\beta$-rays in most cases also emit to a larger extent $\gamma$-rays. With one litre of krypton 85 under normal conditions, this radiation corresponds to a pure $\gamma$-source of 11 Curie. It is necessary to shield this radiation, which—by the way—is also valid for the deceleration radiation generated by pure $\beta$-radiation. One must try also to utilize these radiations for the generation of light by adding heavy-metal salts or heavy metals such as tungsten, tantalum, gold or uranium to the luminescent substances or to the carriers for the luminescent substance in order to obtain a frequency transformation. It is also possible—particularly if lead-silicate plates are used —to simplify the shielding of the radiation reaching the outside and which is necessary with rays of great energy. With the well known arrangements, however, this gives only an insufficient probability for an interaction, i.e., induction effect, of the $\gamma$-rays and deceleration rays with the luminescent substance or layers of other material.

It is the object of the invention to eliminate these disadvantages of the well known lamps and to provide an isotope luminous source with sufficiently great luminous efficiency.

According to the invention, the luminescent substance is prvoided on or in translucent radiation resistant carriers which subdivide the interior space of the lamp into zones the dimensions of which may be, at the most, of the order of the transmission range of the effective radioactive radiation. It is thereby possible to make a greater quantity of radioactive substance and also a greater quantity of luminescent substance effective within a small space. Moreover, the yield is thereby increased in that due to the "nesting," there is a great probability that a $\beta$-particle emitted in any desired direction will, without great energy loss, hit the luminescent layer. There is a greater probability that the $\beta$-rays and also the $\gamma$-rays interact with the luminescent substance or its carrier, respectively. Additions of heavy atomic weight are preferably added at least to a portion of the materials used, for example to the carriers or also to the luminescent substances themselves to achieve this end, The carrier provided for the luminescent substance, for instance, may consist of lead silicate or of a lead containing translucent material. According to the invention, it is also possible to employ higher pressures of the radioactive gases in order to obtain an increased luminous density, because the pressure increase causes an increase of the energy per unit of volume of the radioactive gas.

In order to prevent an electrostatic charging, a thin translucent metal layer may be deposited on the carrier by evaporation.

The carrier for the luminescent substance may consist of an expanded or foam material, or the luminescent substance can be provided on or in jacket shaped foils arranged coaxially with respect to each other or on or in a spiral wound foil. It is further possible with this arrangement to apply different luminescent substances on the various luminescent substance carriers or sections of such carriers lying in one another, in order thereby to provide the possibility of varying the colour of the emitted light, for instance.

The arrangement can also be so conceived that the luminescent substances are arranged in a lamp housing which contains the isotopes in the gaseous state. The radioactive substance is thereby automatically distributed over the small zones which are limited by the nested luminescent substance carriers. It has been found advantageous in such a case to have an inner lamp housing encased in another outer lamp housing with a space therebetween. A substance on which the gaseous isotopes are adsorbed or combined is provided in the space between the inner and the outer lamp housing. It is thereby ensured that no radioactive gas can reach the atmosphere in the event of any possible leakage of the lamp housing.

It is also possible to deposit the radioactive substance as a solid material on a layer of luminescent substance, preferably on both sides thereof, or a radioactive substance may be arranged in a supporting body which is centrally arranged in the lamp housing.

Several embodiments of the invention are schematically illustrated in the accompanying drawings and more fully explained in the following detailed description wherein reference is made to said drawings.

In the drawing:

FIG. 1 is a cross-section of a luminous source according to the invention wherein the carriers for the luminescent susbtance are coaxially arranged.

FIG. 2 is a cross-section of a luminous source wherein the carriers are arranged in the form of parallel flat plates.

FIG. 3 is a cross-section of a luminous source wherein the carrier is spirally wound.

FIG. 4 is a cross-section of a luminous source having both an exterior and an interior housing.

FIG. 5 is a cross-section of a luminous source wherein the luminescent substance is carried within a foamed plastic material; and FIG. 6 is a cross-section of a luminous source wherein the luminescent material is retained within coaxial layers of a foamed plastic material.

Numeral 1 designates a lamp housing in all of the figures appearing in the drawings. The housing is made from radiation resistant glass or another translucent material, for instance, glass with added Ce or quartz. Numeral 2 designates the layers of luminescent substance which are provided on the inner side of the lamp housing (FIG. 1, 2, 3 and 5). The luminescent substance 2 also may be on separate carriers 5 within the housing (FIGS. 2 and 3) or may itself form its own carrier (FIGS. 1 and 4). These carriers may consist of radiation resistant plastic foils, which may either be co-axially arranged jacket shaped bodies lying in one another (FIG. 1) or spiral-wound bodies (FIG. 3). In the embodiment shown in FIG. 2 these consist of plates made from lead containing glass, for instance. It is also possible to use plastic foils 5 into which luminescent powder has been introduced by means of polymerization or which comprise organic additions that have themselves a luminescent effect. Further, radioactive substances may in well known manner be built into the plastic foils or plates 5 or into the luminescent substance.

With the embodiments according to FIGS. 5 and 6, the luminescent substance has been introduced into a foam material 6 by means of polymerization. FIG. 6 shows an arrangement where jacket shaped vessels filled with foamed material are arranged co-axially in one another and where the partition walls 1b, 1c are coated with luminescent substance.

A radioactive product 3a is arranged in a supporting body 4 in the centre of the lamp (FIGS. 1, 3, 4 and 6). The supporting body 4 is in appropriate manner designed as a light reflecting polished hollow metal body. If the wall of the supporting body is perforated, it has been found advantageous to make the surface of the radioactive product light reflecting. The hollow body consists advantageously of a material which increases the number of quanta or corpuscules emitting from the radiator, e.g., by Compton transformation.

The radioactive substance can as a gas, e.g., tritium ($_1H^3$) or krypton 85 ($_{36}Kr^{85}$), fill up the entire interior space of the lamp. Krypton may in this case be under excess pressure. According to FIG. 4, the lamp consists of an exterior housing (1) and an interior housing (1a). The layers of luminescent substance and a radioactive gas are in the interior housing. The intermediate space formed between the two housings 1 and 1a can be evacuated or filled with a gas. It may also contain means, for instance, catalytic agents and absorbers, which absorb any radioactive gas that might escape as a consequence of leakages occurring on the housing. Escaping tritium gas, for instance, is transformed into water and the so formed water is absorbed.

I claim:

1. A luminous source comprising a light transmitting housing, a light transmitting carrier means retained within said housing, a luminescent substance supported on said carrier means, said carrier means dividing the space within said housing into a plurality of zones, radioactive material contained in said zones, the maximum dimensions of said zones being no greater than the order of magnitude of the transmission range of the utilizable radioactive radiation of said radioactive material, whereby radiation produced by said radioactive material strikes said luminescent substance and causes it to emit light.

2. A luminous source comprising a light transmitting housing, means within said housing including a light transmitting carrier and a luminescent substance supported on said carrier, said carrier dividing the space within the housing into a plurality of zones, radioactive material contained in said zones, said zones having a maximum dimension no greater than the order of magnitude of the transmission range of the utilizable radioactive radiation of the radioactive material whereby radiation produced by said radioactive material strikes said luminescent substance and causes it to emit light, said means including a material of a heavy atomic weight.

3. A luminous source comprising a light transmitting housing, a light transmitting carrier means retained within said housing, a luminescent substance supported on said carrier means, said carrier means dividing the space within said housing into a plurality of zones, said carrier comprising a lead-containing composition for rendering said carrier radiation resistant, radioactive material contained in said zones, the maximum dimensions of said zones being no greater than the order of magnitude of the transmission range of the utilizable radioactive radiation of said radioactive material, whereby radiation producer by said radioactive material strikes said luminescent substance and causes it to emit light.

4. A luminous source comprising a light transmitting housing, a light transmitting carrier means retained within said housing, a luminescent substance supported on said carrier means, said carrier means dividing the space within said housing into a plurality of zones, said carrier having a light-transmitting metal coating deposited thereon, radioactive material contained in said zones, the maximum dimensions of said zones being no greater than the order of magnitude of the transmission range of the utilizable radioactive radiation of said radioactive material, whereby radiation produced by said radioactive material strikes said luminescent substance and causes it to emit light.

5. A luminous source comprising a light transmitting housing, a light transmitting carrier means retained within said housing, a luminescent substance supported on said carrier means, said carrier means comprising a foamed plastic dividing the space within said housing into a plurality of zones, radioactive material contained in said zones, the maximum dimensions of said zones being no greater than the order of magnitude of the transmission range of the utilizable radioactive radiation of said radioactive material, whereby radiation produced by said radioactive material strikes said luminescent substance and causes it to emit light.

6. A luminous source according to claim 5, wherein said luminescent substance is incorporated into said carrier.

7. A luminous source comprising a light transmitting housing, a light transmitting carrier means retained within said housing comprising tubular-shaped foils co-axially arranged, a luminescent substance supported on said carrier means, said carrier means dividing the space within said housing into a plurality of zones, radioactive material contained in said zones, the maximum dimensions of said zones being no greater than the order of magnitude of the transmission range of the utilizable radioactive radiation of said radioactive material, whereby radiation produced by said radioactive material strikes said luminescent substance and causes it to emit light.

8. A luminous source comprising a light transmitting housing, a light transmitting carrier means retained within said housing comprising a spirally wound foil, a luminescent substance supported on said carrier means, said carrier means dividing the space within said housing into a plurality of zones, radioactive material contained in said zones, the maximum dimensions of said zones being no greater than the order of magnitude of the transmission range of the utilizable radioactive radiation of said radioactive material, whereby radiation produced by said radioactive material strikes said luminescent substance and causes it to emit light.

9. A luminous source comprising a light transmitting outer housing, a light transmitting inner housing within the outer housing, a light transmitting carrier means retained within said inner housing, a luminescent substance supported on said carrier means, said carrier means dividing the interior of said inner housing into a plurality of zones, a radioactive gaseous isotope under super-atmospheric pressure contained in said zones, the maximum dimensions of said zones being no greater than the order of magnitude of the transmission range of the utilizable radioactive radiation of said radioactive isotope, whereby radiation produced by said radioactive isotope strikes said luminescent substance and causes it to emit light.

10. A luminous source comprising a light transmitting outer housing, a light transmitting inner housing within the outer housing and defining a space therebetween, a light transmitting carrier means retained within said inner housing, a luminescent substance supported on said carrier means, said carrier means dividing the interior of said inner housing into a plurality of zones, a radioactive gaseous isotope under super-atmospheric pressure contained in said zones, the maximum dimensions of said zones being no greater than the order of magnitude of the transmission range of the utilizable radioactive radiation of said radioactive isotope, whereby radiation produced by said radioactive isotope strikes said luminescent substance and causes it to emit light, and means in said space to dispose of any portion of said gaseous isotope which may leak out of said inner housing.

References Cited in the file of this patent
UNITED STATES PATENTS

| | | |
|---|---|---|
| 1,609,322 | Stetson | Dec. 7, 1926 |
| 2,403,316 | Wallhausen | July 2, 1946 |
| 2,661,431 | Linder | Dec. 1, 1953 |
| 2,910,593 | Laing et al. | Oct. 27, 1959 |
| 2,953,684 | MacHutchin et al. | Sept. 20, 1960 |
| 3,005,102 | MacHutchin | Oct. 17, 1961 |